Sept. 25, 1923.

G. R. HOFFMAN 1,468,811

TRANSMISSION OR BRAKE BAND

Filed Jan. 16, 1922

INVENTOR
Glenn R. Hoffman.
BY Ralph Kalish
ATTORNEY

Patented Sept. 25, 1923.

1,468,811

UNITED STATES PATENT OFFICE.

GLENN R. HOFFMAN, OF ST. LOUIS, MISSOURI, ASSIGNOR, BY MESNE ASSIGNMENTS, TO PARKS & BOHNE, INC., OF ST. LOUIS, MISSOURI, A CORPORATION OF MISSOURI.

TRANSMISSION OR BRAKE BAND.

Application filed January 16, 1922. Serial No. 529,649.

*To all whom it may concern:*

Be it known that I, GLENN R. HOFFMAN, a citizen of the United States, residing at the city of St. Louis, State of Missouri, have invented a certain new and useful Improvement in Transmission or Brake Bands, of which the following is a specification, reference being had to the accompanying drawing, forming a part thereof.

This invention relates generally to automobiles and, more particularly, to a certain new and useful improvement in automobile transmission and brake bands.

Considerable trouble, inconvenience, and expense accompany today, so far as I am aware, the removal and repair or replacement of worn or broken transmission bands of especially automobiles of a certain type; and it is the chief object of my present invention to provide a transmission or brake band especially adapted for use in connection with automobiles of the type mentioned which is of simple and efficient form and construction and which is detachable or removable for repair or replacement with ease, convenience, and little expense.

With the above and other objects in view, my present invention resides in the novel features of form, construction, arrangement, and combination of parts hereinafter described and afterwards pointed out in the claims.

In the accompanying drawing,—

Referring now by numerals to the said drawing, I have, for the purpose of illustrating a practical embodiment of my invention, shown the band in connection with a standard automobile construction of which 1 is the transmission-case having the usual removable lid or cover 2, 3 the clutch and slow speed foot pedal, 4—4 the bearings for the pedal-actuated band-engaging rod or pin, and 5 one of the gear-drums.

Figure 1:
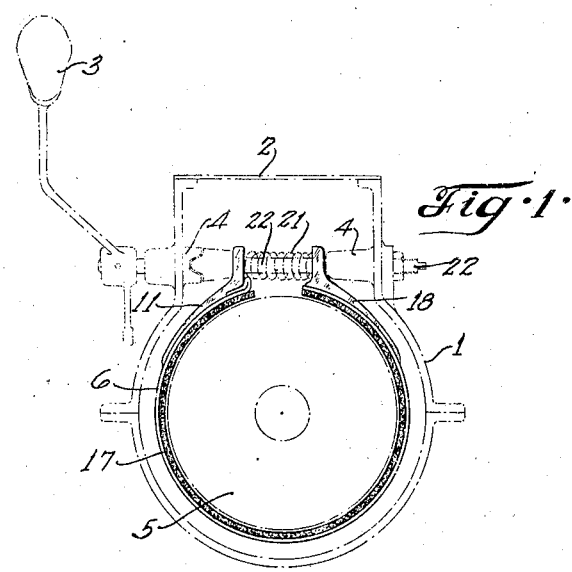
Figure 1 is a side elevational view of a transmission or brake band embodying my invention illustrated in connection with a transmission-case of an automobile of present well-known construction.
Figure 4:
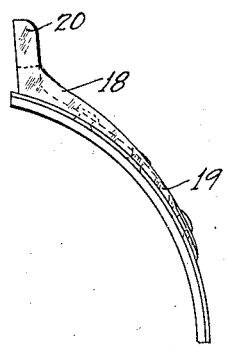
Figure 4 is a fragmental view of the band partly in side elevation and partly in longitudinal section.

The band proper 6 is constructed of suitable spring steel and is of the usual split-ring form with its ends suitably yieldingly spaced, the band 6, however, being bent or doubled upon itself at one end to provide a stop or abutment 7 and a shoulder 8, as best seen in Figures 1 and 4. Disposed in spaced so-called tandem relation upon the outer face of band 6 and also in suitably spaced relation from end-abutment 7, are upstanding headed studs or buttons 9, 9, and formed in band 6 intermediate the shoulder 8 and the buttons 9, is a preferably circular aperture or recess 10.

Figure 2:
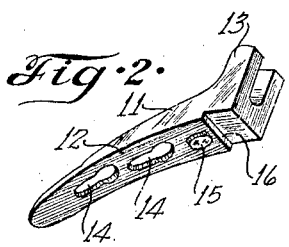
Figure 2 is a perspective view of the detachable ear of the band.

Adapted for co-operation with band 6, is what I designate as an ear 11, which includes a shank 12 arcuated longitudinally to conform to the normal curvature of the described shouldered end of band 6, and a bifurcated or forked head 13 angularly upstanding from the forward end of shank 12, as best seen in Figures 1, 2, and 4. Within its length, the ear-shank 12 is formed or provided with so-called key or button-slots 14, 14, likewise in spaced tandem relation to correspond with the spacing and location of the band-buttons 9—9, and suitably adjacent its headed-end, the shank 12 is provided upon its under face with a short pin or stud 15 adapted, when the ear is in operative position upon band 6, to fit snugly within aperture or recess 10. At its headed-end, the ear 11 is also undercut and shouldered, as at 16, for accommodating and co-operation with shouldered end 7 of band 6.

Disposed upon the inner face of band or ring 6, is the usual lining 17, and riveted or otherwise fixed upon the outer face of the band 6 and upon its other or opposite end, is a second ear 18 likewise including a suitably longitudinally arcuated shank 19 and an angularly-disposed bifurcated or forked head 20 substantially similar to and for co-operation with head 13 of ear 11.

Figure 3:
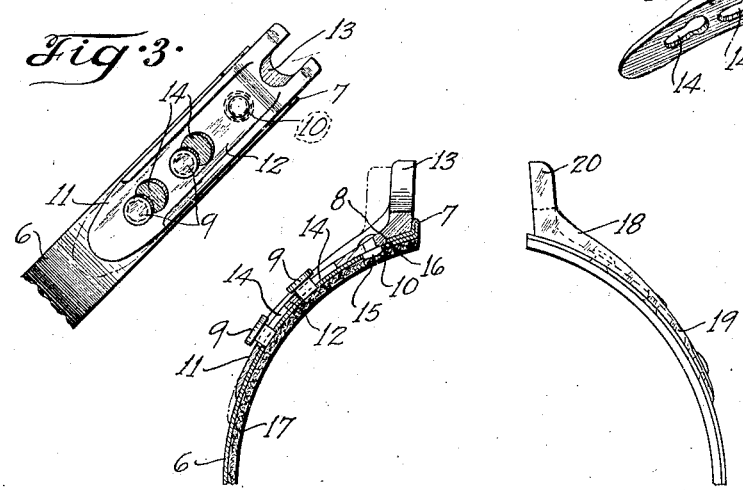
Figure 3 is a fragmental perspective view of the band.

In use or operation, and in assembling the transmission, case-cover 2 is removed, and a band 6 having a fixed ear 18 is disposed within the case 1 and around the drum 5. An ear 11 is then disposed upon the band 6 as seen in Figures 3 and 4, buttons 9 fitting in and engaging the ear-shank 12 at the reduced portions of slots 14, 14, stud or pin 15 fitting in and engaging the band 6 at the aperture or recess 10, and head 13 snugly engaging at its end face and at its shoulder 16 with the end-abutment 7 and shoulder 8 of band or ring 6. And in so attaching the ear 11 upon the band 6, it may be stated here that the shank 12 is disposed upon the band 6 with buttons 9 projecting through the larger portions or enlargements of the slots 14. The ear 11 is then moved longitudinally upon the band to dispose the buttons 9 within the reduced portions of the slots 14, and the ear then sprung into engagement at its stud 15 and shoulder 16 with, respectively, the aperture or recess 10 and the shoulder 8 of the band 6, the end face of its head 13 abutting at such time at its lower edge, as described, against the end stop or abutment 7. As so attached upon the band 6, the ear 11 is rigidly and firmly held against both lateral and longitudinal movement upon or relatively to the band 6 and its head 13 disposed in co-operative relation with the head 20 of the opposite ear 18 previously fixed upon the band. The usual band spring 21 is then disposed between the ears 11 and 18 of the band, and the usual rod 22 projected through the bifurcations of the ear-heads 13 and 20 and through the spring 21 and through the bearings 4 for contracting the band 6 to yieldingly engage the embraced drum 5 against the tension of the spring 21 on actuation of clutch pedal 3.

Should later the lining 17 become worn or the band 6 otherwise require repair or replacement, the case-cover 2 only is removed and spring 21 and rod 22 detached. Then, by means of a suitable tool, not shown, inserted between head 13 and abutment 7, the ear 11 may be sprung out of engagement at its headed-end and at its stud 15 with abutment 7 and recess 10 and then moved longitudinally upon the band 6 to disengage the buttons 9 from the reduced portions of slots 14. The ear 11 may then be readily removed from the band, and the band then as a whole endwise removed from around the drum 5.

My new band is simple in form and construction, may with ease and convenience be included in the assembly or removed for repair or replacement, and greatly facilitates the inexpensive repair and correction of transmission troubles arising from worn or defective bands.

I am aware that changes in the form, construction, arrangement, and combination of the several parts of my new band may be made and substituted for those herein shown and described without departing from the nature and principle of my invention.

Having thus described my invention, what I claim and desire to secure by Letters Patent is:

1. An automobile transmission or brake band comprising, in combination, a split ring of spring steel provided at an end with an ear-abutment, a series of spaced headed-studs upstanding from the ring adjacent said abutment, the ring being recessed intermediate said abutment and said studs, an ear having a rigid shank arcuated to conform to the curvature of and to removably fit upon the ring, said shank being provided with a series of stud-accommodating button-hole slots having their reduced portions disposed away from said ear, and a pin projecting from the under face of said shank for co-operation with said recess, the ear and ring being adapted for interlocking sprung engagement at said abutment for securing the ear in separable engagement at its slots and pin with the studs and recess of the ring.

2. An automobile transmission or brake band comprising a split ring of spring steel provided at an end with an ear-abutment and an adjacent shoulder, a series of spaced headed-studs upstanding from the ring adjacent said shoulder, the ring being recessed intermediate said shoulder and said studs, an ear having a shank shouldered at an end, said shank being arcuated to conform to the curvature of and to removably fit upon the ring and being provided with a series of stud-accommodating button-hole slots having their reduced portions disposed away from its said shouldered end, and a pin projecting from the under face of said shank for co-operation with said recess, the ear and ring being adapted for interlocking sprung engagement at their shouldered ends for securing the ear in separable engagement at its slots and pin with the studs of the ring.

3. An automobile transmission or brake band comprising a split ring, of spring steel doubled upon itself at an end and thereby provided integrally with an ear-abutment and an adjacent shoulder, a series of spaced headed-studs upstanding from the ring, the ring being recessed intermediate said shoulder and said studs, an ear having a shank shouldered at an end, said shank being arcuated to conform to the curvature of and to removably fit upon the ring and being provided with a series of stud-accommodating button-hole slots having their reduced portions disposed away from its said shouldered end, and a pin projecting from the under face of said shank for co-operation with said ring recess, the ear and ring being adapted for interlocking sprung engagement at their shouldered ends for securing the ear in separable engagement at its slots and pin with the studs and recess of the ring.

In testimony whereof, I have signed my name to this specification.

GLENN R. HOFFMAN.